United States Patent Office 3,022,783
Patented Feb. 27, 1962

3,022,783
METHOD OF PRESERVING TISSUE SUCH AS BONES
Eli Jordan Tucker, Jr., Houston, Tex., assignor to National Bone and Tissue Laboratories, Inc., Houston, Tex., a corporation of Texas
No Drawing. Filed Aug. 10, 1960, Ser. No. 48,688
13 Claims. (Cl. 128—1)

The present invention relates to a method of preserving animal bones and simultaneously encouraging cell growth during such preservation whereby such preserved bones may be transplanted without deleterious effects at later times to other living bodies, there to stimulate the host body to grow bone cells to unite with the graft; this application disclosing the present invention being a continuation-in-part application of my co-pending application Serial No. 411,043 filed February 18, 1954, for Method of Preserving Bones, and now abandoned. Also, this application disclosing the present invention is a continuation-in-part application of my co-pending application Serial No. 534,174, filed September 13, 1955, for Preserved Tissue and Method of Tissue Preservation for Heterogeneous Grafts, and now abandoned.

My prior Patent No. 2,485,791, issued October 25, 1949, for Bone Bank and Method of Preserving Bones for Transplantation relates to a method of preserving and categorizing human bones for transplantation. Since custom, legislation and practical considerations restrict the supply from human sources of suitable tissues, such as bones, for preservation in accordance with the teachings of the above patent, it is desirable to provide a method of preserving tissue, such as bones, which may be derived from other than human sources and transplanted into humans without deleterious effects, and in manner to stimulate the host body to grow bone cells to unite with the material of the graft. Accordingly, it is likewise desirable to arrive at body material sources which may be the sources of heterogeneous grafts between any species of animal, human and/or non-human.

In the preservation of body material or tissue such as the tissue comprising bones for use as the material of grafts, such as heterogeneous grafts, it is desirable to preserve the graft material in such fashion as to discourage the propagation of antigens or antibodies which would ordinarily attach in peripheral proximity to the cells of such material. When the graft material can be preserved while at the same time the propagation of such antigens and antibodies is discouraged and blocked, it has been found that the cells of body material grafted after having been thus preserved are not belabored by such antigens and antibodies which otherwise would adhere to the cells with an adherence in such manner as to militate against favorable reactions, or in such manner as to set up undesirable reactions between the body material to be grafted and the parent bed of the graft. Observations of results supporting this discovery have been made with body material thus preserved and used for grafting with the consequence that graft material thus preserved now supplies one of the most desirable sources of material for grafts in plastic and orthopedical surgery operations, and for operations related thereto.

In the preservation of such body material in refrigerated blood components, as in the presence of plasma or serum, the increased diminution and separation of such antigens and antibodies from the preserved cells take place in such manner that the antigens and antibodies pass off into the plasma or serum and eventually dwindle away under the metabolic action accompanying such conditions. To enhance such action it has been found that the blood component container in which the tissues are preserved should best not be filled completely with the component but rather an air space should be left a distance from the top of the container so that a volume of oxygen is provided therein which by oxygenation reaches those body material cells in state of preservation and in reaction causes the drawing off of the antigens and antibodies therefrom. Such oxygenation effect can be enhanced by controlled periodic or continuous agitation or oscillation of the container.

In such preservation of body material it is desirable that the preservation should be conducted in such a way that the growth of fibroblastic cells is encouraged in those types of tissues which produce cells of long life, such as, for instance, in the cells of bone. Following in order of longevity is cartilage, and then tendons. The preservation process also is extended in lesser degree to shorter lived cells, such as the cells of blood vessels, fascia, muscles, ureters, and cornea. At the end of the series, cells of still shorter life span, such as the cells of skin tissues and nerves can be preserved by such process although in many cases skin tissues and nerves are so short lived that the encouragement of cell growth in the preserving medium approaches the point of diminishing returns.

The preservation process not only has application in preserving healthy tissue, such as healthy bone and other tissue for employment as grafting material, but additionally the process may be employed to preserve unhealthy tissue, as particularly infected tissue to be grafted after preservation into a body for the purpose of developing a particularly desired immunizing serum to be employed later to vaccinate against or counteract such particular infection.

The osteogenic factor is now known to be a property of graft material, such as bone preserved after the teaching of this invention, and this factor stimulates the host to grow bone cells to unite with the graft. This factor has been present in all experiments involving the preservation of bone in refrigerated, unfrozen baths of blood components, such as plasma or serum from the same type of body as that furnishing the graft material. It has now become possible to recognize this factor for its great value in heterogeneous bone grafting whereas previously it has been believed that heterogeneous grafts made after the teaching of this invention derived success because the method of preservation provided the bone graft material as a permeable bone structure so that it grew more rapidly than the bed of the graft.

As now viewed the bone graft material in heterogeneous grafting provides a definitely developed property, now identified as such osteogenic factor, above referred to, which stimulates the formation of new or additional bone by the host. This factor or property has been present from the beginning of the experiments which have been carried out in perfecting this invention, and host bone growth will be apparent from a consideration of the accompanying microscopic sections and from a consideration of the patent drawings made therefrom.

In detail this developed osteogenic factor in the graft bone has been found to consist of muco-protein and muco-polysaccharides of bone which react with the bone cells of the host to form new bone, the new bone cells finding sustenance on which they grow in such muco-protein and muco-polysaccharides of bone which the method of graft bone preservation has developed in its period of preservation in the plasma or serum bath.

One of the most important recent discoveries in the method of preserving various tissues, including bones, for subsequent heterogeneous grafting resides in finding that ingredient which will substantially enhance the depletion of antigens in the matter preserved, such ingredient comprising the addition of a soluble sodium sulfonamide to the bath to increase the hydrogen ion concentration of the bath accompanied by the production of a sodium salt linked with the protein preserved and in manner that the protein is double sulphur bonded to the amide ring of the said soluble sodium sulfonamide, the result comprising changing the protein to a less antigenic character.

It is consequently a primary object of the present invention to so provide a method of preserving bones and/or other tissues of various animals whereby they may be transplanted at a later time to other living bodies.

Another object of the present invention is to provide a method of preserving animal bones and/or animal tissues in blood plasma or serum of the same type animal from which the bone or other tissue being preserved was obtained.

Still another object of the invention is to provide a method of simultaneously preserving animal bones and/or other tissues and encouraging new cell growth of the bone and/or other tissue during such preservation.

Another object of this invention is to provide a supply of preserved bones and/or other tissues which may be transplanted from one animal to another during surgery as required.

Still another object of the invention is to provide a method of preserving bones and/or other tissues by storing them in plasma or serum of the same type animal from which such bones and/or other tissues were obtained, whereby the bones and/or other tissues thus preserved will be maintained in a viable condition for transplanting to other animals, including humans at later times.

Still another object of the invention is to provide a method of encouraging fibroblast cell growth on bones and/or other tissues which are being preserved for transplantation at a later time into another living body.

Still another object of the invention is to provide a method of encouraging fibroblastic cell growth on bones and/or other tissues which are preserved for transplantation at a later time into another living body, wherein the bone and/or other tissue being preserved is maintained in normal saline and in the presence of an antibiotic agent in a solution including plasma or serum of the animal type from which the bone and/or other tissue preserved was removed.

A still further object of the invention is to provide a bone and/or tissue bank of various animal bones and/or tissues which are maintained in a medium of plasma or serum from the same type animals as the type of animals from which the bones and/or tissues are taken thereon in a maner that they may be transplanted at later times to other living animal bodies.

It is also another important object of this invention to preserve bone and/or other tissue in such a manner as in a refrigerated body of blood components as plasma or serum from the same species of animal as that from which the bone and/or other tissue is taken and in normal saline, and in the presence of an antibiotic agent, in such a manner as to diminish and separate the antigens or antibodies from the preserved cells.

It is an additional object of this invention to enhance the operation of separating antigens or antibodies from the cells of the preserved bone and/or tissue by providing a volume of oxygen to react with the antibodies in their withdrawal and to provide for agitation of the container to further enhance the separate action of the oxygen with relation to the antigens and antibodies.

It is an additional object of this invention to preserve bone and/or other tissue in a medium for preservation in such a state as to encourage the growth of fibroblastic cells in the type of tissue having cells of longer longevity down to the point where the cells are so short-lived in certain types of tissues that a point of diminishing returns is reached where the encouragement of cell growth cannot render any results of consequential benefit.

It is also a special object of this invention to provide an immunizing serum or vaccine and also to provide a process of making such immunizing serum or vaccine by preserving a particularly infected tissue in plasma or serum of the same type of animal as that from which the tissue has been obtained and then grafting it into another living body, such as a living body of type different from the body providing the infected tissue, to develop in such other living body the source of an immunizing serum or vaccine.

It is yet a further object of this invention to provide a method of preserving bones for grafting in manner to develop an osteogenic factor consisting of muco-protein and muco-polysaccharides of bone whereby when the bone thus preserved is grafted such osteogenic factor stimulates the growth of the host bone or bed for the graft.

It is a further and most important object of this invention to provide a preserved tissue, as bone and the like, so preserved as to greatly lessen the antigenic character of the matter preserved, such being accomplished by the addition of a soluble sulfonamide component to the bath to increase its hydrogen ion concentration and correspondingly to produce sodium salt linked with the protein tissue preserved which tissue in turn is bonded by a double sulphur bond to the amide ring of the sulfonamide thereby to change the protein to a less antigenic protein.

The present process is directed to preserving bone and/or other tissue from any warm blooded animal source, whereby it may be transplanted from one animal to the other or to humans without any deleterious effect to the parent bed to which it is transplanted. Such process is also directed in the case of tissue having cells of certain longevity such as bone tissue for encouraging new cell growth of the tissue during preservation which facilitates the ease with which such transplanted tissue integrates with the body onto which it is transplanted.

It is contemplated that tissue such as bone and/or other tissue from any suitable animal source may be used in practicing the invention including, by way of example, domestic animals such as sheep, bovine, hogs, dogs, cats and horses. However, regardless of source, and kind of tissue it must be removed from the body source under sterile conditions so as to inhibit contamination thereof by foreign matter or bodies which might cause harmful effects during its preservation or upon it being transplanted in its preserved state onto another body. Also, it is desirable that the tissue of whatever kind should be obtained promptly after death of the animal while it is still alive in order to inhibit deterioration. Also, it is desirable that only healthy tissue, free from disease, should be employed for preservation in order to prevent obvious harmful effects occurring during preservation or occurring later in the graft bed into which such preserved tissue is to be transplanted; therefore the donor animals must be tested to eliminate those with disease.

It is not necessary to classify the various animal bones and/or other animal tissues in the practice of this invention to classify these various tissues correspondingly as taught in Tucker Patent No. 2,485,791 wherein classification of human bones was made as to Rh factor and blood type, nor is it necessary in practicing the present invention to classify the blood of the original source as to type or characteristic. However, in order to preserve whatever kind of tissue which may be selected for grafting and in order to encourage and maintain new cell growth during the preservation thereof, it is necessary that the graft material be maintained in a plasma or serum solution, which plasma or serum must be from the same type of animal as that of the graft material being preserved.

It has been determined that when tissue such as bone and/or other tissue is removed from the animal source and placed in a container with a solution of plasma or serum from the same type animal as the tissue to be preserved therein, new cell growth occurs during the period of preservation, so long as the plasma or serum furnishes proper nutrition for the material under preservation and to its cells.

Microscopic examinations of portions of the material under preservation may be made at suitable intervals to determine if cells have begun to deteriorate, as by atrophy or necrosis in the case of cells of certain longevity. Such conditions, if noted upon examination, may be overcome and proper growth and life conditions for the particular tissue under preservation may be maintained by replenishing the container with a new and fresh supply of plasma or serum. The plasma or serum added must, of course, be of the same type animal as such particular tissue being preserved. To this extent it is necessary that proper indication of the kind of tissue in each container be noted at the time that such tissue is removed from the source and placed in the container.

In practicing the invention, the tissue, such as bone and/or other tissue, when removed from the body source, is placed in a container of a suitable type such as glass and of a suitable size to accommodate the volume of the particular graft material to be preserved. However, any suitable storage material which is inert relative to the contents contained therein, and which will not deteriorate upon storage may be used.

The solution to be placed in the container may consist of plasma along with any suitable antibiotic such as penicillin or sodium sulfadiazene. The plasma used may be diluted up to 90 percent by volume with normal saline solution; however, since the maintenance of tissue life of any particular graft material is dependent upon the presence of sufficient plasma, a stronger solution may be used if the graft material is to be stored indefinitely. Also, use of a stronger solution, such as whole plasma, as an example, will eliminate the necessity of making frequent examinations of the graft material to determine if deterioration has occurred. Also, serum may be used in place of plasma in which case, however, the graft material will not be maintained viable as long as it would if plasma is used.

It has been determined that if the container contents are maintained at relatively low temperatures as compared with the normal body temperature of the body source of the graft material, the rate of depletion of nutrition from the plasma or serum to the graft material is materially reduced. However, if the temperature of container contents is frozen, it has been determined that any particular tissue sought to be preserved will die and will not become viable when such dead tissue is transplanted into a living body. Therefore, in order to reduce the intervals at which it may be necessary to replenish the plasma or serum in the container on the one hand, while on the other hand, maintaining the particular tissue being preserved viable, it has been determined that the optimum storage temperature is 5° C., but that higher refrigerating temperatures may be used.

It has also been discovered that all animal tissue such as bone and/or other kinds of tissue, when preserved as described herein, are not only maintained viable, but in the case of tissues of certain longevity a fibroblastic cell growth is encouraged. As to this feature of fibroblastic cell growth notice should be taken that the fibroblastic cell is the most primitive of tissue cells and its maintenance and encouraged growth by immersion in the plasma or serum solution in the container should be especially recognized. It has also been found that preservation of such graft material, as bone and/or other tissue in a plasma or serum both as hereinabove described also increases the growth of the periosteum or skin of the bone and also converts at least the peripheral osteocytes into fibroblastic tissue.

It should be further noted that the plasma or serum used is from the same animal as the particular tissue being preserved although it is not necessary to provide the plasma or serum from the very same animal which served as the donor source for such tissue. For example, if oxen tissue is being preserved then any oxen plasma or serum may be used as the preserving medium, if horse tissue is being preserved then any horse plasma or serum may be used. On the other hand oxen plasma cannot be used for successfully preserving tissue of a different kind of animal, such as a horse.

As a matter to be particularly noted in such preservation, it has been found that the antigens or antibodies which surround cells in peripheral proximity are drawn away from the graft material being preserved into the bath of plasma or serum to deteriorate therein as by the natural deterioration of metabolism.

To enhance this withdrawal of antigens or antibodies from the cells of the graft material under preservation it has been found desirable that the container should be of a size to contain the volume of material to be preserved inundated in the bath of plasma or serum with an air space of size being provided thereabove, such space approximating by volume say one-fourth of the volume of the bath.

It then follows that in due course of oxygenation the oxygen from the air will permeate the bath and react with the antigens or antibodies in such combinative manner as to hasten the dispersion and separation thereof into the plasma or serum bath.

It has been determined that tissues of various kinds, types and classes may be preserved by the hereinabove described processes, such tissues extending from those having long-lived cells as bones, cartilages, and tendons, to tissues of shorter cell life such as blood vessels, cornea, fascia, muscles, ureters, down to the shortest cell life tissues such as skin and nerves.

As a distinct enhancement of the process, including the enhancement of oxygenation and consequent increased withdrawal of the antigens or antibodies from the cells of the preserved tissue, it has been found advantageous to agitate the container at controlled intervals or at a controlled rate to thereby increase the oxygenation of the preserved graft material.

In cases where such graft materials have been employed in making heterogeneous grafts, the withdrawal of the antigens or antibodies from the particular graft material being preserved results in a graft material which will not react in opposition to the antigens or antibodies of the parent body receiving the tissue, and thus a better and more positively operable graft is obtainable than in the case of a graft made using a graft donation which has been freshly taken and not thus preserved.

As a specific example of the preservation and use of tissue other than bone tissue, a calf cornea has been preserved after the processes of this invention and grafted on the cornea of a blind dog and in a manner to give vision, such graft having taken and upon examination union having been observable, and the dog presently passing tests indicating restored vision when such tests were given six weeks after the graft.

As another specific example of the preservation and use of tissue other than bone tissue, calf skin tissue preserved after the manner of this invention was grafted on a dog and during observation the graft indicated having "taken" or combined, and presently six weeks after the graft the skin shows having knitted to the dog and the flow of the blood stream of the dog through the grafted skin is indicated by test.

As a third specific example of the preservation or use of tissue other than bone tissue, a calf tendon preserved after the hereinabove described method of tissue preservation was grafted onto the lacerated shoulder of a human patient and the grafted tendon knitted or combined with the shoulder tissue and presently, after eight weeks, the graft indicated by test as having "taken" to supply the tendon operation of which the patient would otherwise have been deprived by injury.

Also as a specific example, the applicant used a cultured calf bone maintained after the disclosure of the herein application and operated on the back of a patient on January 18, 1954, to perform a needed spinal graft; and after the operation he put her in a back brace. She reported to him that she fell off of a chair on August 4, 1954, with attendant severe pain. The applicant realized that even if the cultured calf bone may have been dislocated by the fall, nevertheless healing would take place, so he left the patient in her back brace with the result that by October 4, 1954, she was healed and could bend her spine without pain.

That also, as another specific example, late in 1952, he treated a patient for a back injury, using traction and a cast. Later, on August 26, 1953, the patient reported he fell and had injured his back in the back end of a pickup truck. He was then placed in a back brace which produced no improvement so that an operation was necessary on August 20, 1954. In this operation the applicant employed a cultured calf bone graft supplemented by ground calf bone, both kept by the method of the herein invention, the graft being used to effect a lumbosacral fusion, with the ground calf bone filling the interstices. This operation was successful so that the patient could return to light work within approximately one month after the operation and thereafter was able to lift heavy weights without pain.

As still another specific example, a widowed housewife patient, sixty-five years old, reported that in November 1953, she fell and broke both the ulna and radius of her left forearm. The applicant operated upon her, May 4, 1954, and employed cultured calf bone grafts for both fractured members. Within two months the breaks were knitted and the patient was able to use her arm efficiently without pain.

Hereinabove it has been disclosed how tissue, including bones, may be preserved in a bath of blood components, such as plasma or serum, the bath being maintained in refrigerated state but above freezing, an antibiotic agent being used to prevent the growth of bacteria and the like. Subsequently it has been discovered that the employment of a substance which may have antibiotic qualities but which additionally serves as a denaturizing agent will create a marked and novel effect in greatly discouraging the development of antigens. Such additional discovery consisted of applying a soluble sodium sulfonamide component to the bath of homologous serum or plasma in which the tissue, homologous to the bath, is to be preserved. With the tissue, as bone, kept in a homologous plasma or serum bath, the sodium salt from the soluble sodium sulfonamide becomes linked with the protein and the protein becomes double sulphur bonded to the amide ring of the said soluble sodium sulfonamide, with the result that the protein is converted to be much less antigenic.

As a specific example, two dogs were injected intravenously with fresh bovine plasma. After a month, during which time the dogs had had time to become sensitive to the bovine plasma, the two dogs were again injected intravenously with bovine plasma, and both went into anaphylactic shock, and one dog died. The other survived and approximately one month later this surviving dog was injected with bovine plasma to which a soluble sodium sulfonamide had been added. The surviving dog displayed no reaction whatsoever to this third injection, proving that the addition of the sodium sulfonamide had rendered the bath capable of inhibiting the growth of, and capable of depleting the antigenic capacity of the tissue preserved.

As a further specific example the applicant prevailed upon a doctor in a clinical laboratory to test one hundred patients who were allergic to ordinary allergies such as asthma, food inhalants, and the like, and of the hundred tested four were found to be allergic to bovine plasma. He then tested these four by injecting them with bovine blood components in soluble sulfathiazole and these four showed no reaction.

As is well known, the absence of antigens results in a graft which will take much more readily than in the case of grafts preserved in the same manner but without a soluble sodium sulfonamide having been added to the bath.

The invention has application beyond the immediate purposes of preserving graft material and transplanting it in grafts, since additionally this the invention may be carried to further steps and employed to provide an immunizing serum or vaccine by preserving a tissue infected with any particular disease in a plasma or serum bath of the same type of animal as that from which the tissue has been obtained. Thereafter the preserved grafting material with its preserved infection, may be transplanted into another living body of a different type of animal to develop in such host animal body the desired immunizing serum or vaccine. Thus, the developed serum or vaccine may later be taken from the body in which it has been produced, and employed for inoculations.

Thus the present process is directed to preserving tissue as bone and/or other tissue from any warm blooded animal source, whereby it may be transplanted from one animal to the other or from animals to humans without any deleterious effect to the graft bed onto which it is transplanted. Also, the invention further relates to a process for encouraging new cell growth as fibroblastic cell growth, and to the conversion of the peripheral osteocytes of a graft into fibroblastic tissue. Also in bone grafting it relates to a process which increases the growth of the periosteum or skin of the bone. Additionally the invention relates to the method of preserving tissue, as bones for grafting, in a manner such that the graft material develops an osteogenic factor which stimulates and sustains the growth of tissue, as bone, in the host body, as a body of a different species. Furthermore the invention relates to the preservation of tissue having any specific infection, and transplanting it in another body of a different species to develop therein a serum or vaccine to be employed for inoculations.

Most broadly the invention relates to a method of preserving graft tissue such as bone and/or other tissue of various types in plasma or serum from the same type animal as the tissue being preserved whereby such graft material may be transplanted at later times to other living human or animal bodies.

The invention is stated not to be limited to the use of the exact materials of preservation set forth herein, nor to the exact number and sequence of method steps, but other materials and other method steps and sequences thereof are considered as well as such may fall within the broad spirit of the invention and within the broad scope of interpretation claimed for and merited by the appended claims.

What is claimed is:

1. A method of reducing the antigenicity of dumb animal tissue so as to render it universally compatible with human tissue, such tissue and encouraging cell growth thereof during preservation, comprising testing dumb animals for disease, removing tissue from a tested healthy dumb animal body under sterile conditions, placing the tissue in a container having in normal saline therein a soluble sodium sulfonamide compound, an antibiotic agent, and a blood component bath from the type of animal from which the tissue has been removed, maintaining the container contents at temperatures substantially below normal body temperatures and above freezing, developing osteogenic factor conditioned muco-protein and muco-polysaccharides of tissue during preservation, increasing the hydrogen ion concentration of the of bath during preservation by the reaction of the soluble sodium sulfonamide component of the bath with the tissue to produce sodium salt linked with tissue protein bonded by a double sulphur bond to the amide ring whereby the protein is more denatured and less antigenic, converting peripheral fibroblasts during preservation to fibroblastic tissue and encouraging the growth of tissue cells, testing the preserved tissue at intervals to observe for indications of atrophy and necrosis, and replenishing when necessary the blood components with blood component from the type of animal from which the tissue under preservation has been obtained, whereby upon heterogeneously grafting the tissue thus preserved onto a live animal the osteogenic factor will stimulate tissue graft growth in the graft bed and the depletion of antigens and denaturing results in the graft tissue more readily taking with the graft bed.

2. A method of reducing the antigenicity of dumb animal bone so as to render it universally compatible with human bone, preserving such bone encouraging cell growth thereof during preservation comprising testing dumb animals for disease, removing bone from a tested healthy dumb animal body under sterile conditions, placing the bone in a container having in normal saline therein a soluble sodium sulfonamide compound, an antibiotic agent, and a blood component bath from the type of animal from which the bone has been removed, maintaining the container contents at temperatures substantially below normal body temperatures and above freezing, developing osteogenic factor, conditioned muco-protein and muco-polysaccharides of bone during preservation, increasing the hydrogen ion concentration of the bath during preservation by the reaction of the soluble sodium sulfonamide component of the bath with the bone to produce sodium salt linked with bone tissue protein bonded by a double sulphur bond to the amide ring whereby the protein is more denatured and less antigenic, converting peripheral osteocytes during preservation to osteoblastic bone tissue and increasing the growth of bone cells and periosteum, testing the preserved bone at intervals to observe for indications of atrophy and necrosis, and replenishing when necessary the blood component with blood component from the type of animal from which the bone under preservation has been obtained, whereby upon heterogeneously grafting the bone thus preserved onto a live animal body the osteogenic factor will stimulate the bone graft growth in the graft bed and the depletion of antigens results in the graft bone more readily taking with the graft bed.

3. A method of reducing the antigenicity of dumb animal bone so as to render it universally compatible with human bone, preserving such bone and encouraging cell growth thereof during preservation as claimed in claim 2 in which the bone preserved and grafted is bovine bone.

4. A method of reducing the antigenicity of dumb animal tissue so as to render it universally compatible with human tissue, preserving such tissue and encouraging cell growth thereof during preservation as claimed in claim 1 in which the blood component comprises plasma.

5. A method of reducing the antigenicity of dumb animal tissue so as to render it universally compatible with human tissue, preserving such tissue and encouraging cell growth thereof during preservation as claimed in claim 1 in which the blood component comprises serum.

6. A method of reducing the antigenicity of dumb animal tissue so as to render it universally compatible with human tissue, preserving such tissue and encouraging cell growth thereof during preservation as claimed in claim 1 in which the blood component comprises 10% whole plasma.

7. A method of reducing the antigenicity of dumb animal tissue so as to render it universally compatible with human tissue, preserving such tissue and encouraging cell growth thereof during preservation as claimed in claim 1 in which the blood component comprises 10% serum.

8. A method of reducing the antigenicity of dumb animal tissue so as to render it universally compatible with human tissue, preserving such tissue and encouraging cell growth thereof during preservation as claimed in claim 1 in which the tissue comprises one of the group of long lived tissues including bone, cartilage, tendons, blood vessels, fascia, muscles, ureters, and cornea.

9. A method of reducing the antigenicity of dumb animal tissue so as to render it universally compatible with human tissue, preserving such tissue and encouraging cell growth thereof during preservation as claimed in claim 1 in which the container is agitated to enhance reaction of the contents therewithin.

10. A method of reducing the antigenicity of dumb animal tissue so as to render it universally compatible with human tissue, preserving such tissue and encouraging cell growth thereof during preservation as claimed in claim 1 in which the container is aerated and in which the air permeation of the bath and the reaction of oxygenation with the tissue antigens in combinative nature hastens the dispersion and separation thereof from the tissue into the bath and the subsequent deterioration thereof, and the association of the antigen depleted tissue with the bath encourages the growth of fibroblastic cells.

11. A method of reducing the antigenicity of dumb animal tissue so as to render it universally compatible with human tissue, preserving such tissue and encouraging cell growth thereof during preservation as claimed in claim 1 in which the container is agitated to enhance reaction of the contents therewithin, and in which the container is aerated so that the air permeation of the bath and the reaction of oxygenation with the tissue antigens in combinative nature hastens the dispersion and separation thereof from the tissue into the bath and the subsequent deterioration thereof and the association of the antigen depleted tissue with the bath encourages the growth of fibroblastic cells.

12. A preserved tissue for heterogeneous grafting universally compatible with human tissue comprising a healthy, viable dumb, animal body tissue combined with a normal saline bath including a soluble sodium sulfonamide compound, an antibiotic agent and blood components from the type of animal from which the tissue has been removed, said preserved tissue including muco-protein and muco-polysaccharides rendered extraordinarily permeable by said bath, said tissue being excessively antigen depleted and denatured by reaction producing sodium salt linked tissue protein which is amide ring bonded by double sulphur bonds, said tissue also including fibroblastic tissue converted from peripheral fibroblasts and also including growing tissue cells.

13. A preserved bone for heterogeneous grafting universally compatible with human bone comprising a healthy, viable dumb animal body bone combined with a normal saline bath including a sodium sulfonamide compound, an antibiotic agent and blood components from the type of animal from which the bone has been removed, said preserved bone including muco-protein and muco-polysaccharides rendered extraordinarily permeable by said bath, said bone being excessively antigen depleted and denatured by reaction producing sodium salt linked tissue protein which is amide ring bonded by double sulphur bonds, said bone also including osteoblastic bone tissue and growth produced periosteum converted in the bath from peripheral osteoblasts and also including growing bone tissue cells.

References Cited in the file of this patent

UNITED STATES PATENTS

| | | |
|---|---|---|
| 2,485,791 | Tucker | Oct. 25, 1949 |
| 2,621,145 | Sano | Dec. 9, 1952 |
| 2,658,021 | Earle | Nov. 3, 1953 |

OTHER REFERENCES

Guileminet: Journal of Bone and Joint Surgery, November 1953, vol. 35 B, No. 4, pages 562, 566–567. (Copy in Library.)

Tissue Culture Technique, Cameron, second edition, 1950, pp. 26 and 27. (Copy in Div. 43.)